July 28, 1970  W. S. JOSEPHSON  3,521,893
NONEXTRUSION RING
Filed May 14, 1968
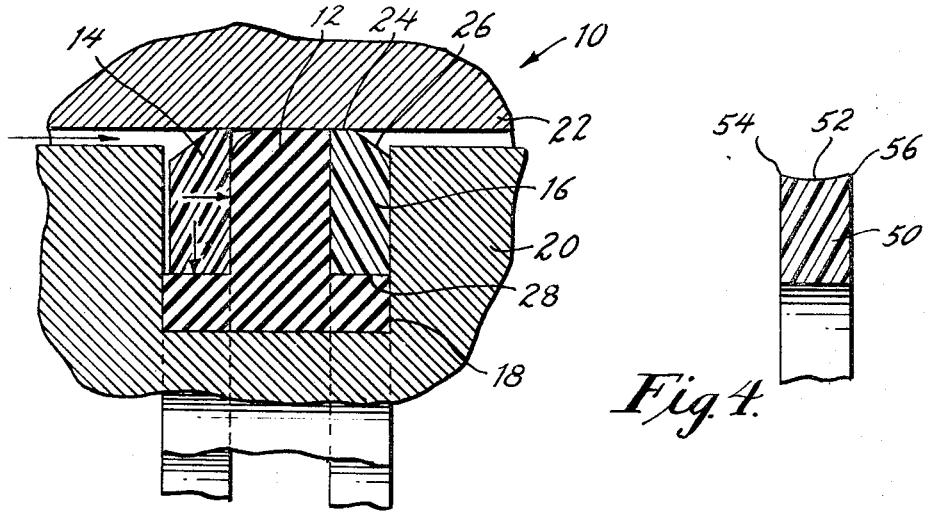
Fig.1.
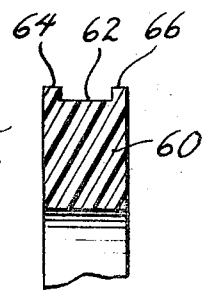
Fig.4.
Fig.5.
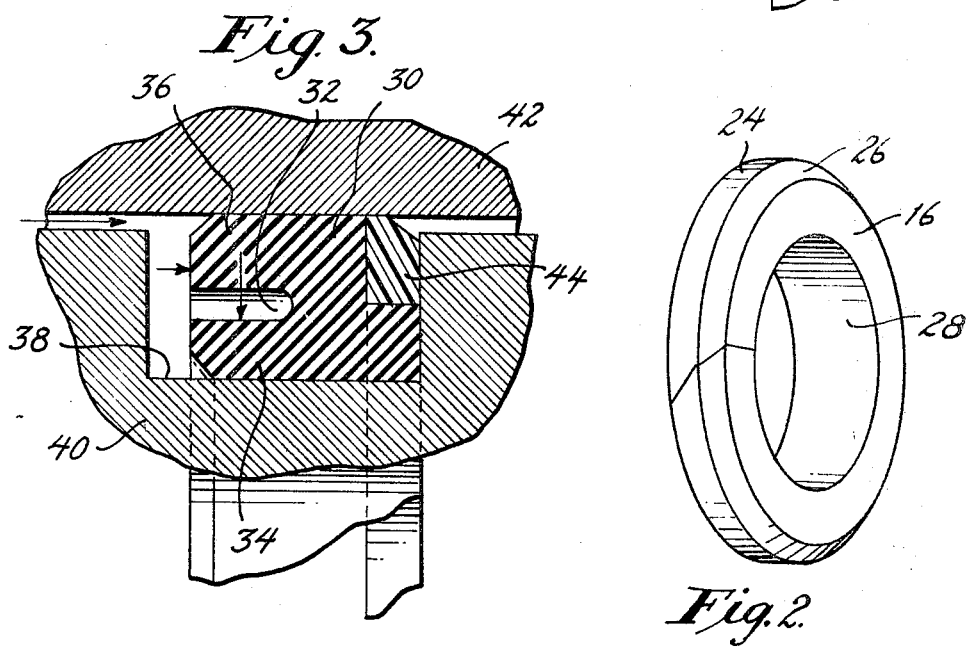
Fig.3.
Fig.2.
INVENTOR.
WALTER S. JOSEPHSON
BY
Seidel & Gonda
ATTORNEYS.

United States Patent Office 3,521,893
Patented July 28, 1970

3,521,893
NONEXTRUSION RING
Walter S. Josephson, Skippack, Pa., assignor to Greene Tweed & Co., Inc., North Wales, Pa., a corporation of Pennsylvania
Filed May 14, 1968, Ser. No. 729,053
Int. Cl. F16j *15/00;* F16l *21/02*
U.S. Cl. 277—188                              4 Claims

ABSTRACT OF THE DISCLOSURE

At least one non-extrusion ring is used in cooperation with an elastomeric ring in order to provide a seal between two relatively movable surfaces and prevent extrusion of the elastomeric ring. The non-extrusion ring has sufficient tensile strength so that it does not extrude into the clearance between the relatively movable surfaces. The area of contact of the non-extrusion ring with one of the relatively movable surfaces must be minimized in order to exceed the yield strength of the non-extrusion ring at the area of contact and thereby provide intimate contact between the non-extrusion ring and said one of the relatively movable surfaces. The relationship is defined by the equation:

$$T_1/T_2 = P/Y$$

wherein $T_1$ is the thickness or axial length of one peripheral surface of the non-extrusion ring at the point of contact with one of the relatively movable surfaces; $T_2$ is the thickness or axial length of the other peripheral surface of the non-extrusion ring; P is the fluid pressure; and Y is the yield strength of the material of the non-extrusion ring.

---

The use of elastomeric rings and non-extrusion rings and more particularly to a non-extrusion ring which will not extrude into a clearance between two relatively movable surfaces and which will be in intimate contact with the surface being sealed when pressure is applied.

The use of elastomeric rings and non-extrusion rings to effect a seal between two moving parts is well-known. It is also known that the non-extrusion rings must have sufficient tensile strength so that they do not extrude into the clearance between the relatively movable surfaces. However, when a material having a tensile strength substantially higher than the fluid pressure is utilized, such material will normally have a correspondingly higher yield strength. In many instances, the yield strength prevents the extrusion ring from having intimate contact with the surface being sealed. Hence, extrusion may occur. In order to obtain intimate contact between the non-extrusion ring and the surface being sealed the yield strength of the material at the area of contact must be exceeded.

It is a primary object of the present invention to provide a new design for a non-extrusion ring which will overcome the deficiencies of prior art sealing devices.

It is another object of the present invention to provide a non-extrusion ring with an optimum relationship defined by an equation whereby the present invention may be utilized in numerous applications.

It is still another object of the present invention to provide a non-extrusion ring which will have sufficient tensile strength so that it will not extrude into the clearance between two relatively movable surfaces and yet will have intimate contact with the surface being sealed.

It is a further object of the present invention to provide a non-extrusion ring which overcomes the deficiencies of prior art non-extrusion rings and is highly effective in use.

Other objects will appear hereinafter.

The above and other objects are accomplished by providing a non-extrusion ring having a reduced area portion juxtaposed to the surface to be sealed. A reduced area portion may be provided in any desired manner, such as by mitering the outer periphery of the ring or by providing a groove in the outer periphery of the ring or in any other desired manner. The optimum relationship is defined by the equation:

$$T_1/T_2 = P/Y$$

wherein $T_1$ is the thickness or axial length of contact of the extrusion ring at one periphery thereof with the surface to be sealed;
$T_2$ is the thickness or axial length of the extrusion ring at the other periphery thereof;
P is the fluid pressure; and
Y is the yield strength of the material of the non-extrusion ring.

For the purpose of illustrating the invention there is shown in the drawings forms which are presently preferred; it being understood, however, that this invention is not limited to the precise arrangements and instrumentalities shown.

FIG. 1 is a sectional view of a sealing device installed between two surfaces utilizing one embodiment of a non-extrusion ring of the present invention.

FIG. 2 is a perspective view of the non-extrusion ring of FIG. 1;

FIG. 3 is a section view similar to FIG. 1 showing the use of the non-extrusion ring of the present invention in cooperation with a different form of elastomeric sealing ring;

FIG. 4 is a section view of another embodiment of a non-extrusion ring which may be utilized.

FIG. 5 is a further embodiment of a non-extrusion ring which may be utilized.

Referring now to the drawings in detail wherein like numerals indicate like structure throughout the several views there is shown in FIG. 1 a sealing device embodying the principles of the present invention designated generally as 10. The sealing device 10 includes a sealing T-ring and a pair of non-extrusion rings 14 and 16.

The sealing ring 12 may be composed of any suitable elastomeric material depending upon the particular application of the invention.

The sealing ring 12 can be formed from any suitable resilient gasketing material, such as neoprene (CR), nitrile (NBR), natural rubber (NR) and synthetic elastomeric material of any description which are useful for the particular type of seal desired. Selection of a suitable material is well within the capabilities of one skilled in the art and would require no exercise of inventive faculty. Preferably, the types of materials employed in conventional O-ring seals will find utility herein.

The sealing ring 12 and the non-extrusion rings 14 and 16 are adapted to be installed in a groove 18 on a rod 20 juxtaposed to a housing 22. Referring now to FIG. 1, when subjected to pressure from the left, the sealing device 10 assumes the position shown in FIG. 1 and provides a highly effective seal.

The non-extrusion rings 14 and 16 are preferably composed of the same material. If two non-extrusion rings are provided adjacent each face of sealing ring 12, the inboard non-extrusion rings would preferably be made of a material with a lower yield strength than the outboard rings.

The non-extrusion rings can be selected from normal non-resilient, non-extrudable materials used in sealing assemblies including nylon, Teflon, phenolic and bronze. Selection of appropriate non-extrudable materials, of course, depends upon the application for the sealing assembly. The size and character of the machine elements being sealed, the fluid against which leakage protection is desired, the temperature, pressure, surface finish, speed and direction of motion and other pertinent conditions will dictate the kinds of materials to be employed in the sealing assembly of the present invention.

The non-extrusion rings 14 and 16 are substantially identical and accordingly, only ring 16 will be discussed in detail. Ring 16 has a reduced area portion 24 on its outer peripheral surface adjacent the housing 22. The outer periphery of the ring 16 is mitered as at 26 to provide the reduced area portion 24. The inner peripheral surface 28 of the ring 16 has a substantially larger surface area than the surface 24. The provision of the smaller surface 24 facilitates an intimate seal between the housing 22 and the ring 16. The split non-extrusion ring 16 is shown in detail in FIG. 2.

It is well-known that a non-extrusion ring must have a tensile strength sufficiently great so that it does not extrude into the clearance between the rod 20 and housing 22. It has been found that if a desired surface such as surface 26 is not provided, the yield strength of the ring 16 will not be exceeded and intimate contact between the ring and the housing 22 will not be obtained. Accordingly, the provision of the reduced area portion 24 insures intimate contact between the ring and the housing. This relationship is defined by the following equation:

$$T_1/T_2 = P/Y$$

wherein $T_1$ is the thickness or axial length of contact of the surface 24 of the ring 16 with the housing 22; $T_2$ is the thickness or axial length of contact of the surface 28 of the ring 16 with the ring 12; P is equaled to the pressure of the fluid acting upon the sealing device 10; and Y is the yield strength of the material of the ring 16.

In FIG. 3 there is disclosed a modified form of sealing ring utilized in connection with a non-extrusion backup ring. The sealing ring 30 is split at U-shaped groove 32 to define an inner leg 34 and an outer leg 36. As shown, the ring 30 is in a collapsed state when inserted in the groove 38 on a rod 40. The rod is juxtaposed to a housing 42.

The non-extrusion ring 44 may be identical with the non-extrusion ring 16 and accordingly need not be further discussed herein in detail. The equation set forth above is also applicable to the relationship for the non-extrusion ring 44.

Other embodiments of non-extrusion rings are disclosed in FIG. 4 and FIG. 5. In FIG. 4, the outer periphery 52 of the non-extrusion ring 50 is provided with a curved shape so that only the outermost portions 54 and 56 of the ring will contact the housing.

In FIG. 5, the outer periphery of the non-extrusion ring 60 is provided with a centrally disposed groove 62 and two projecting flanges 64 and 66 adjacent the groove. Again, the equation set forth above applies with equal force to the rings disclosed in FIGS. 4 and 5.

Sealing rings of various shapes may be utilized with the non-extrusion rings of the present invention. Similarly, the shape that various non-extrusion rings shown may be varied without departing from the instant invention.

While the sealing device has been disclosed in a groove of a movable member, it could also be inserted in a groove in the housing without departing from the invention.

The present invention may be embodied in other specific forms without departing from the spirit or essential attributes thereof and, accordingly, reference should be made to the appended claims rather than to the foregoing specification as indicating the scope of the invention.

I claim:
1. A sealing device for machine elements wherein said machine elements include two relatively movable members exposed to fluid pressure, said movable members having juxtaposed surfaces, said sealing device including an elastomeric sealing ring having a groove at one end, a non-extrusion backup ring received in said groove, the area of one peripheral surface of said non-extrusion ring being substantially greater than the area of the other peripheral surface of said non-extrusion ring, the relationship of the peripheral surfaces of said non-extrusion ring being defined by the equation

$$T_1/T_2 = P/Y$$

wherein $T_1$ is the axial length of contact of said one peripheral surface of the non-extrusion ring which contacts one of said two relatively movable members, $T_2$ is the axial length of said other of said peripheral surface of said non-extrusion ring, P is the fluid pressure acting upon the sealing device and Y is the yield strength of the material of the non-extrusion ring, whereby the non-extrusion ring will prevent extrusion of said sealing ring and will also be in intimate contact with said one of said two relatively movable members.

2. A sealing device as set forth in claim 1 wherein said non-extrusion ring is mitered at said one peripheral surface to reduce the area of said one peripheral surface with said one of said relatively movable members.

3. A sealing device as set forth in claim 1 wherein said one peripheral surface of said non-extrusion ring is provided with a groove defined by two upstanding flanges.

4. A sealing device as set forth in claim 1 wherein said one peripheral surface of said non-extrusion ring has a curved outer surface and has points of contact for engaging said one of said two relatively movable members.

References Cited

UNITED STATES PATENTS

| 2,459,642 | 1/1949  | Hamilton et al. | 277—188 X |
| 3,009,721 | 11/1961 | Newton          | 277—188   |
| 3,271,038 | 9/1966  | Bastow.         |           |
| 3,300,225 | 1/1967  | Shepler         | 277—188 X |

FOREIGN PATENTS 923,013   4/1963   Great Britain.

SAMUEL ROTHBERG, Primary Examiner

U.S. Cl. X.R.

277—176